United States Patent
Tracht et al.

(10) Patent No.: US 7,891,701 B2
(45) Date of Patent: Feb. 22, 2011

(54) SEAT HAVING A SIDE AIRBAG MODULE

(75) Inventors: Michael Tracht, Ingolstadt (DE);
Rainer Penzel, Freising (DE); Thomas Klisch, München (DE); Sebastian Geithner, München (DE); Wolfgang Herrmann, München (DE)

(73) Assignees: Lear Corporation, Southfield, MI (US); Bayerische Motoren Werke Aktiengesellschaft, Munich (DE)

( * ) Notice: Subject to any disclaimer, the term of this patent is extended or adjusted under 35 U.S.C. 154(b) by 386 days.

(21) Appl. No.: 11/996,471

(22) PCT Filed: Jul. 22, 2005

(86) PCT No.: PCT/EP2005/008036

§ 371 (c)(1),
(2), (4) Date: Apr. 22, 2008

(87) PCT Pub. No.: WO2007/009479

PCT Pub. Date: Jan. 25, 2007

(65) Prior Publication Data

US 2008/0211274 A1 Sep. 4, 2008

(51) Int. Cl.
*B60R 21/16* (2006.01)
(52) U.S. Cl. .................................... 280/730.2
(58) Field of Classification Search ............... 280/730.2
See application file for complete search history.

(56) References Cited

U.S. PATENT DOCUMENTS 5,826,938 A    10/1998  Yanase et al.

(Continued)

FOREIGN PATENT DOCUMENTS

DE    198 60 312    7/1999

(Continued)

OTHER PUBLICATIONS

International Search Report for the corresponding PCT Application No. PCT/EP2005/008036 mailed Mar. 31, 2006.

(Continued)

*Primary Examiner*—Faye M. Fleming
(74) *Attorney, Agent, or Firm*—Brooks Kushman P.C.

(57) ABSTRACT

A seat (1), in particular a backrest (2) comprises a seat structure (3), a cover (4), and a back panel (5), which back panel (5) has at least one lateral wall (6) covering a receiving space (7) formed in a side wall (8) of the backrest (2), in which a soft cover side airbag module SAM (9) is arranged, wherein the airbag of the SAM (9) will deploy between cover (4) and a free end (10) of the lateral wall (6) in a deployment direction (11). To improve such a seat to provide it with an excellent outer appearance, wherein the danger of an inadvertent opening of a lateral wall is substantially reduced, and wherein the deployment of the airbag is by no means negatively influenced, but supported in an advantageous way, a package plate (12) is arranged between the SAM (9) and an inner surface (13) of the lateral wall (6) which package plate (12) is fastened at its back end section (14) to the SAM (9) and releasably at its front end section (15) within the receiving space (7), wherein the airbag will deploy between front section (15) and cover (4).

38 Claims, 7 Drawing Sheets

U.S. PATENT DOCUMENTS

| | | | |
|---|---|---|---|
| 7,195,277 B2 * | 3/2007 | Tracht et al. | 280/730.2 |
| 7,290,793 B2 * | 11/2007 | Tracht | 280/730.2 |
| 7,393,005 B2 | 7/2008 | Inazu et al. | |
| 7,540,529 B2 * | 6/2009 | Tracht et al. | 280/730.2 |
| 2004/0227335 A1 | 11/2004 | Acker et al. | |
| 2005/0006933 A1 | 1/2005 | Bargheer et al. | |
| 2006/0113759 A1 * | 6/2006 | Tracht et al. | 280/730.2 |
| 2006/0113760 A1 * | 6/2006 | Tracht et al. | 280/730.2 |

FOREIGN PATENT DOCUMENTS

| | | |
|---|---|---|
| DE | 199 15 831 | 10/2000 |
| DE | 19915831 | 10/2000 |
| DE | 10 2005 017 395 | 11/2006 |
| EP | 1375264 | 1/2004 |
| FR | 2861352 | 4/2005 |

OTHER PUBLICATIONS

German Office Action for the corresponding German patent application 11 2005 003 642.1-56 mailed Dec. 1, 2008.

* cited by examiner

SEAT HAVING A SIDE AIRBAG MODULE

A seat, in particular a backrest, comprises a seat structure, a cover and a back panel, which back panel has at least one lateral wall covering a receiving space formed in a side wall of the backrest, in which a soft cover side airbag module (SAM) is arranged, wherein an airbag of the SAM will deploy between cover and a front end of the lateral wall in a deployment direction.

Such a seat is disclosed by EP 0 768 216 B1. The SAM comprises an inflatable airbag and further parts like an inflator means, collision sensor, an electric controller, etc. The cover of the backrest is extended to the receiving space along a side wall of the backrest and in case of activation the airbag will deploy between the cover and a free end of the lateral wall of the back panel. To obtain enough space for such a deployment, a lateral wall is connected to the rest of the back panel along a vertical groove which acts as a hinge element for opening the lateral wall in case of airbag deployment.

According to this known prior art, it is possible that the lateral wall does not appropriately close the receiving space such that gaps are visible from the outside, for example, between cover and free end of the lateral wall. Moreover, it is possible that because of the groove between the lateral wall and the rest of the back panel, the lateral wall will open in case, for example, the user of the seat touches the lateral wall such that the receiving space and the airbag module arranged therein are visible. Also, the groove may be visible from the outside, wherein the overall optical appearance of the seat, and in particular of the backrest, is deteriorated.

It is an object of the invention to provide a seat with an excellent outer appearance, wherein the danger of an inadvertent opening of the lateral wall is substantially reduced and wherein the deployment of the airbag is by no means negatively influenced, but supported in an advantageous way.

This object is solved by a seat with the features of claim 1.

According to the invention, a package plate is arranged between SAM and inner surface of the lateral wall, which package plate is fastened at its back end section to the SAM and releasably fastened at its front end section within the receiving space, wherein the airbag will deploy between front end section and cover.

According to the arrangement of the package plate, it is no longer necessary to particularly form back plate or its lateral wall because deployment of the airbag is controlled by the package plate. Back panel and lateral wall can be manufactured independent from the deployment of the airbag. Furthermore, the deployment direction is further controlled by the fastening of the package plate at its back end section and the releasable fastening at its front end section such that the airbag will deploy between cover and front end section of the package plate, wherein together with the package plate also the lateral wall will open. By such means it is possible that the opening of the lateral wall of the back panel is more or less independent from the deployment of the airbag as this and in particular the deployment direction are controlled by the relative arrangement of cover and front end section of the back panel and the particular characteristics of the back panel during its opening.

To have a back panel with a particular form to differentiate between the fixing of the back panel to the seat structure or other structures of the seat and the front end section where the airbag will leave the receiving space, the package plate may comprise at least a first plate portion with a back end section and a second plate portion with a front end section, wherein the plate portions are connected essentially perpendicular to each other. The first plate portion is only used for fixing the package plate to the seat, whereas the second plate portion is formed and selected to meet the corresponding requirements for airbag deployment. Deviations from such a 90° angle between the two plate portions are possible wherein the angle may be in a range of 70° to 110°.

For fixing a package plate, a first and a second holding part may be used. The first holding part can be fixed to the seat structure as well as the second holding part, wherein the first holding part is also used for releasably fixing the SAM. The package plate is fixed with the first end to the first holding part and with the second end to the second holding part.

To prevent in an easy way any visibility of the package plate from the exterior of the seat, it may extend from its first end to a bending point, wherein it approaches an inner surface until a further bending point, and thereafter it extends away from the inner surface of the lateral wall under an angle of approximately 5° to 30° to a second holding part.

According to an easy embodiment of the invention, the second plate portion may extend along the inner surface of the lateral wall wherein second plate portion and inner surface are in abutment such that no free space is formed between both.

According to another embodiment, a free space is formed between the second plate portion and the inner surface of the lateral wall, wherein they still may be parallel to each other.

To obtain a front end section which easily may be handled, it is a further advantage if, with respect to the second plate portion, the front end section is bent away from the lateral wall in direction to the interior of the receiving space. In such a case there is a greater distance between front end section and inner surface of the lateral wall.

According to an advantageous embodiment, the further bending point is arranged where the distance between the SAM and the inner surface of the lateral wall is smallest.

It is possible to provide corresponding fastening means for fastening front end section within the receiving space at any position along the front end section. According to an advantageous embodiment, a free end of the front end section may comprise a plate fastening means for releasably fastening the package plate to the seat structure and/or the side airbag module (SAM).

In case SAM and package plate are fastened to the seat structure, it may be an advantage if the seat structure comprises a first bracket adapted to mount the SAM and/or a second bracket adapted to releasably fasten the free end or front end section of the package plate.

To simplify the holding parts for the package plate, it is possible that the first and the second holding parts are plates in particular releasably fixed to corresponding seat structure.

For easy fixing of the package plate at its first end, it is possible to provide a fixing tongue at this first end used for fixing to the first holding part.

The fixing tongue and a plate section of the package plate between the two bending points may be arranged perpendicular to each other.

In this connection it may be considered if first and/or second brackets are stamped-out parts of the seat structure. A corresponding stamped-out part may be bent and then may be further treated to allow the fastening of the corresponding parts.

In case the SAM should be improved in its handling and to secure same during transport, it is possible that a mounting plate is arranged at least partially between SAM and seat structure, wherein SAM is mounted to the mounting plate and the mounting plate is fixed to the seat structure. The fixation between mounting plate and seat structure may be releasable. An embodiment of such releasable fixation is, for example, a bolt/nut connection or other such connections. It is also possible to weld the mounting plate to the seat structure.

The lateral wall of the back panel extends at least as long in direction to the front part of the backrest that an end cover section arranged on the side wall of the backrest and extending in direction to the receiving space is covered by the lateral wall. To simplify the fastening of the cover it may have a free end portion arranged within the receiving space and may comprise cover fastening means adapted to fasten the cover at the seat structure and/or mounting plate.

As the package plate will at least partially open in case of deployment of the airbag and to prevent any influence on the cover in such a case, the cover fastening means and the plate fastening means may independently cooperate with the mounting plate and/or the seat structure. This means that cover fastening means and plate fastening means do not interfere in case the package plate is opened.

One possibility to prevent such interference is an arrangement of cover and/or plate fastening means in different levels along a longitudinal direction of the backrest. For example, one cover fastening means may be arranged in one level wherein a number of plate fastening means are arranged in other levels along this longitudinal direction. Of course, it is also possible to arrange a number of cover and a number of plate fastening means, each in different levels along this direction.

A further possibility in this respect is to alternately arrange cover and plate fastening means along said longitudinal direction of the backrest.

An easy way for fixing the cover within a receiving space for the SAM is to provide a profiled latch at an end section of the cover which comprises for example three hook-up noses which engage corresponding hook-in openings of the second holding part.

To allow the deployment of the airbag the package plate should open at its free end if the airbag pushes or presses it with a certain force. Consequently, the fastening means are releasable and they should be released in case a corresponding force is applied by the inflating airbag.

One possibility of such plate fastening means is a hook-like element inserted in a hook-in opening formed in the mounting plate and/or the seat structure. Of course, it is also possible that there are hook-in openings in mounting plate and seat structure which are at least partially overlapping such that the hook-like element may be inserted in both hook-in openings simultaneously. It is also possible that there are for example two hook-like elements from which one is inserted in hook-in opening of the mounting plate and the other in hook-in opening of the seat structure.

One possibility of such hook-like element is a hook extension at the front end section extending essentially parallel to the second plate portion.

Another possibility for such a hook-like element is a hook extension at the front end section bent in direction to the lateral wall.

To arrange the corresponding hook-like element in a certain distance with respect to the inner surface of the lateral wall, the front end section may comprise at least a first wall portion extending under an acute angle with the second plate portion relative to the inner surface of the lateral wall.

At the end of this first wall portion a corresponding hook-like element may be arranged.

According to a further embodiment, the front end section may comprise also a second wall portion extending essentially perpendicular relative to the inner surface of the lateral wall at one end of the first wall portion, wherein a corresponding hook-like element is arranged at the end of the second wall portion.

Another possibility is a hook-like element which comprises at least one opening in which a protrusion extending from the seat structure and/or mounting plate is inserted.

Such a protrusion may also be a stamped-out and bent part of the seat structure or mounting plate. It is, of course, bent in direction to the corresponding opening of the hook-like element to be inserted in same.

Another possible plate fastening means is one formed by a pin-like element arranged between front end section of the package plate and the seat structure and/or the mounting plate. Such a pin-like element is inserted in a corresponding opening of the seat structure or mounting plate and will be disengaged from this opening in case of airbag deployment.

Another possibility is forming the plate fastening means as a rivet arranged between front end section and seat structure and/or mounting plate. This rivet may connect the front end section to both seat structure and mounting plate. It is also possible to fix the front end section only at the seat structure or the mounting plate.

In case of a rivet as such a plate fastening means, there should be some kind of breaking element of this rivet or a breaking element in the seat structure or the mounting plate where the rivet is fixed. This breaking element will then break in case the inflating airbag presses or pushes with a particular predetermined force.

Also other plate fastening means comprising such predetermined breaking points are possible, which again will be broken by inflating the airbag and applying a predetermined force on the corresponding breaking point.

One further possibility of such a fastening means with a predetermined breaking point is a toggle arranged between the front end section of the package plate and the seat structure and/or mounting plate.

It is also possible to fasten the package plate at parts of the backrest different from the seat structure or mounting plate. One possibility of such fastening is a plate fastening means formed by a hook-like and/or bracket-like element protruding in direction to the inner surface of the lateral wall and cooperation of those elements with a bracket-like and/or hook-like element, respectively, protruding from the inner surface of the lateral wall. According to such an embodiment, lateral wall and package plate are fastened, wherein there may be an additional plate fastening means as outlined above. However, it is more advantageous to just use corresponding plate fastening means only between package plate and lateral wall.

For example, according to one embodiment of such a plate fastening means, a hook-like element is formed at the package plate and a corresponding bracket-like element protrudes from the inner surface of the lateral wall, wherein both are engaged until the airbag is so much inflated that this engagement is released and that package plate and lateral wall are further opened to the outside to allow the deployment of the airbag in deployment direction.

With respect to the hook-like and/or bracket-like element, it is possible that those elements of the package plate are formed as stamped-out parts of this plate.

To allow first a particular degree of opening of the package plate prior to also opening the lateral wall, it may be also advantageous when a distance between inner surface of the lateral wall and outer surface of the package plate is increasing in direction to the free end of the lateral wall.

To simplify the construction of the back panel, it may have constant wall thickness.

To improve the covering of the SAM and to simultaneously put back the connection of the cover within the receiving space of the SAM and also optically hide this connection, the corresponding end section of the lateral wall extends further than SAM and at least partially also along the cover.

For covering the SAM, in particular for a driver's seat, and to obtain the possibility to display the SAM a little bit to the rear, the back panel may comprise a bulging in connection to the lateral wall, which bulging protrudes from the backrest to the rear.

In the following, advantageous embodiments of the invention are further explained in connection with the accompanying figures.

In the following the same parts of the seat are notified by the same reference numerals and some of those reference numerals are only mentioned in combination with one figure.

Figure 1:
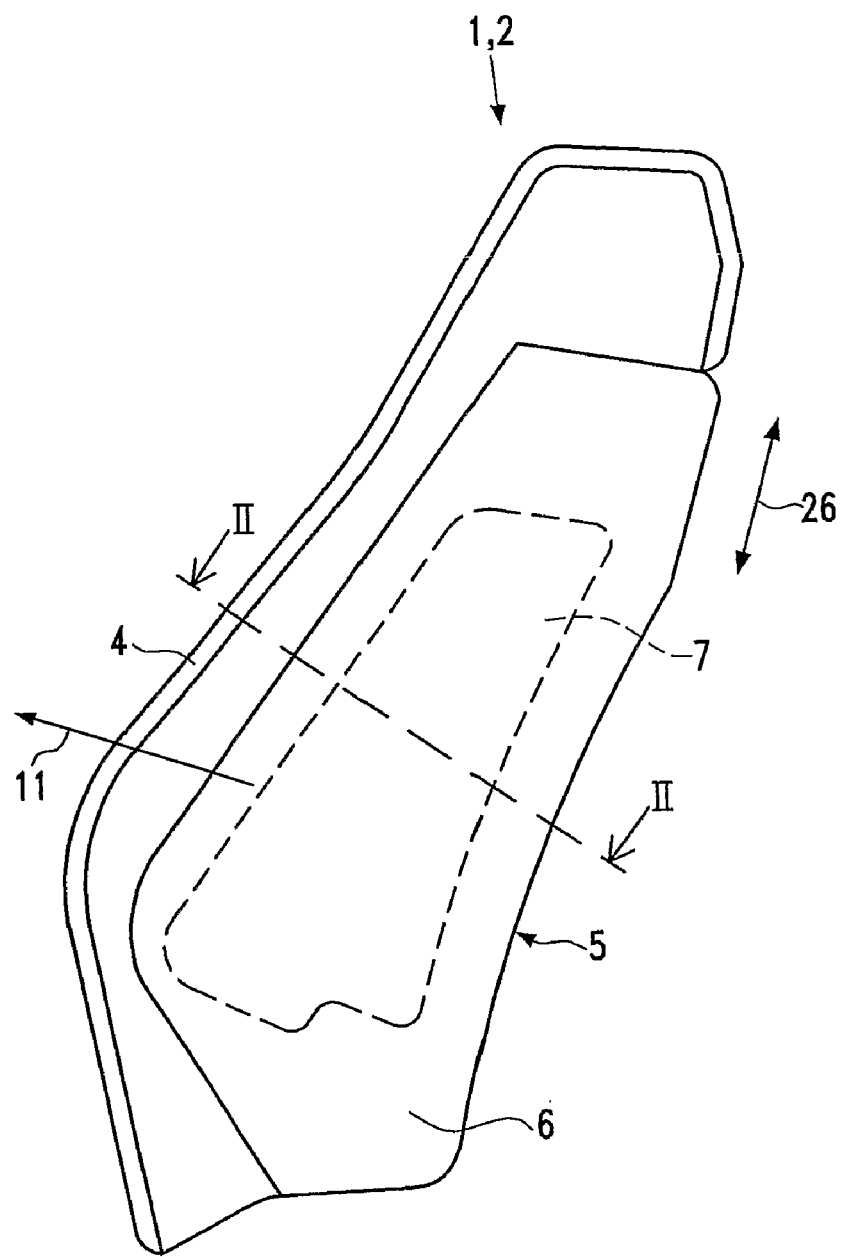
FIG. 1 shows a lateral view of a seat and, in particular, of a backrest of this seat.

In FIG. 1 a lateral view of a backrest 2 of a seat 1 of a vehicle is illustrated. In this lateral view a side wall 8 of the backrest 2 is visible which is at least partially covered by a lateral wall 6 of back panel 5. Beneath the lateral wall 6 a receiving space 7 is formed in the side wall 8 of the backrest 2. Within this receiving space 7 a soft cover side airbag module (SAM) 9 is arranged. Upon activation of the SAM 9 a corresponding airbag will be inflated and will be deployed in deployment direction 11. Such SAM 9 are arranged in vehicle seats 1 at least on the side of the seats nearest to the corresponding vehicle door.

The backrest 2 mainly extends in the longitudinal direction 26 along which direction also the back panel 5 or the lateral wall 6 extend.

Figure 2:
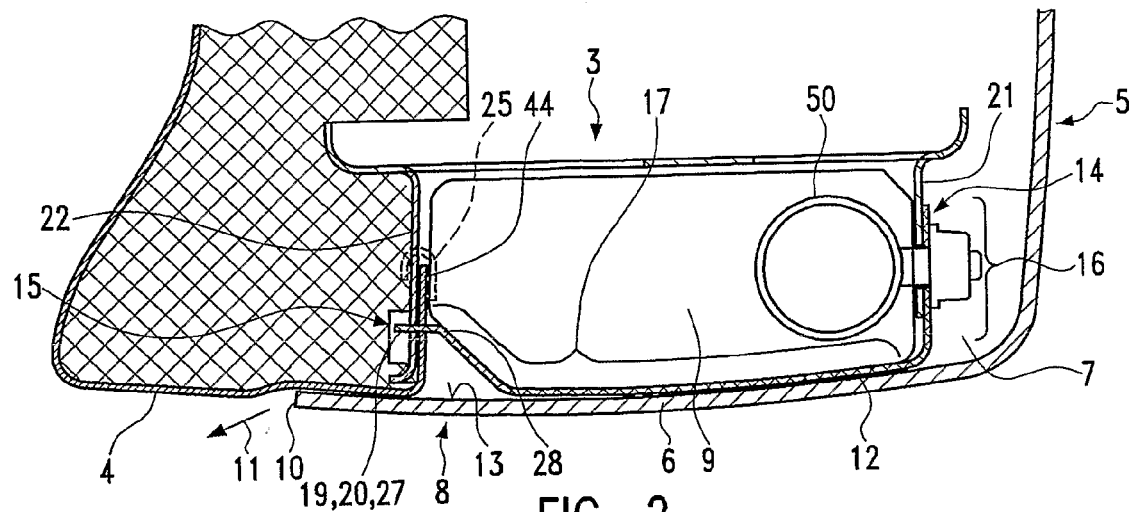
FIG. 2 shows a cross-section along line II-II for a first embodiment of the invention.

In FIG. 2 a first embodiment of the invention corresponding to a cross-section along line II-II of FIG. 1 is illustrated.

Between SAM 9 and an inner surface 13 of lateral wall 6, a package plate 12 is arranged comprising a first plate portion 16 and a second plate portion 17. The first plate portion 16 is used for mounting the package plate 12 together with SAM 9 to a seat structure 3. For this reason the seat structure 3 comprises two stamped-out parts forming a first bracket 21 and a second bracket 22. The first bracket 21 mainly extends in a direction to lateral wall 6 and inflator means 50 as part of SAM 9 is fixed to this bracket 21 by a bolt 48/nut 49 connection. The same connection is also used for fixing first plate portion 16 of package plate 12. The second bracket 22 is used for fastening the package plate 12 at its free end 19 which hook-like element 27 is formed as a plate fastening means 20. The plate fastening means 20 is part of front end section 15 of the package plate 12 which is formed at the end of the second plate portion 17, see also the following figures.

SAM 9 and package plate 6 are arranged in the receiving space 7 which is closed by lateral wall 6 to the outside wherein a free end 10 of the lateral wall together with an end portion are in contact with an outer surface of a part of cover 4. This part of cover 4 is arranged at the side wall 8 of the backrest 2 wherein this part is partially introduced in the receiving space 7 and fastened there by corresponding cover fastening means 25, see the corresponding clip-like element. The cover fastening means 25 are arranged in different levels along longitudinal direction 26 of the backrest 2 compared to corresponding plate fastening means 20. The corresponding fastening means 20, 25 for plate and cover may be alternately arranged along this longitudinal direction 26.

Figure 3:
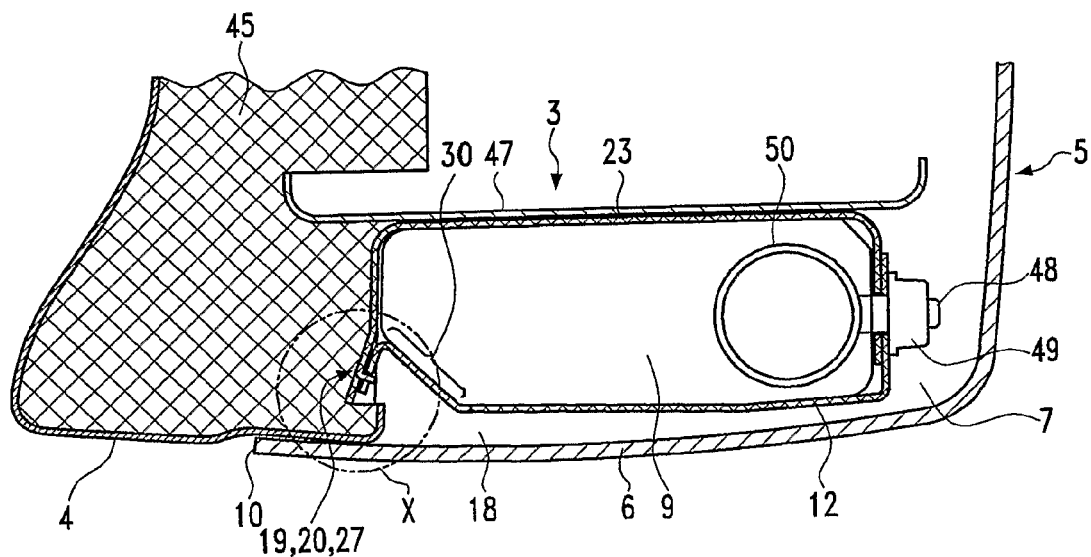
FIG. 3 shows a cross-section like FIG. 2 for a second embodiment.

In the embodiment according to FIG. 2 the lateral wall 6 is in abutment with the package plate 12 and only a first wall portion 30, see also FIG. 3, of front end section 15 is bent inwardly such that the hook-like element 27 is spaced and essentially extends parallelly with respect to inner surface 13 of lateral wall 6.

For insertion of hook-like element 27, a hook-in opening 28 is formed in bracket 22.

It is again noted that cover 4 with its cover free end 44 has generally no opening through which a hook-like element 27 is guided, but that the cover 4 only extends up to its free end 44 within the receiving space 7 where no hook-like elements 27 of the package plate 12 are arranged.

The second embodiment according to FIG. 3 has different plate fastening means 20 at free end 19 of front end section 15. Moreover, the package plate 12 is arranged in a distance to inner surface 13 of lateral wall 6 such that a free space 18 is formed therebetween. This free space 18 is increasing in direction to free end 10 of lateral wall 6 wherein the distance 42, see also FIG. 9, between outer surface 43 of package plate 12 and inner surface 13 of lateral wall 6 increases.

Moreover, according to FIG. 3, a mounting plate 23 is arranged between SAM 9 and plate-like element 47 of seat structure 3. No brackets are stamped out of this plate-like element 47, see in contrast the embodiments according to FIGS. 2 and 8.

The inflator means 50 is fixed to the mounting plate 23 by the corresponding bolt 48/nut 49 connection, wherein simultaneously back end section 14 of package plate 12 is fixed to the mounting plate.

Figure 4:
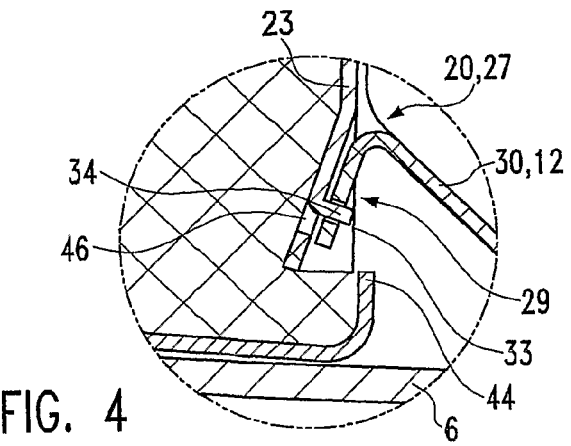
FIG. 4 shows an enlarged detail "X" of FIG. 3.

In FIG. 4 detail "X" of FIG. 3 is illustrated in an enlarged scale. The plate fastening means 20 at the front end section 15 again comprises a hook-like element 27 which is bent in direction to lateral wall 6 with respect to first wall portion 30 of package plate 12. For connecting hook-like element formed as hook extension 29 of the front end section 15 a protrusion 34 is formed by mounting bracket 23. This protrusion 34 is a stamped-out part of the mounting plate, see stamp-out opening 46, and inserted in an opening 33 of the hook-like element 27.

In FIG. 4 the cover free end 44 ends inside the receiving space 7 but is so short that it ends in front of the corresponding hook extension 29. As already outlined above, in other levels along longitudinal direction 26 of backrest 2 the cover may extend farther to the inside of the receiving space and at the corresponding free end 44, cover fastening means 25, see FIG. 2, may be arranged.

Figure 5:
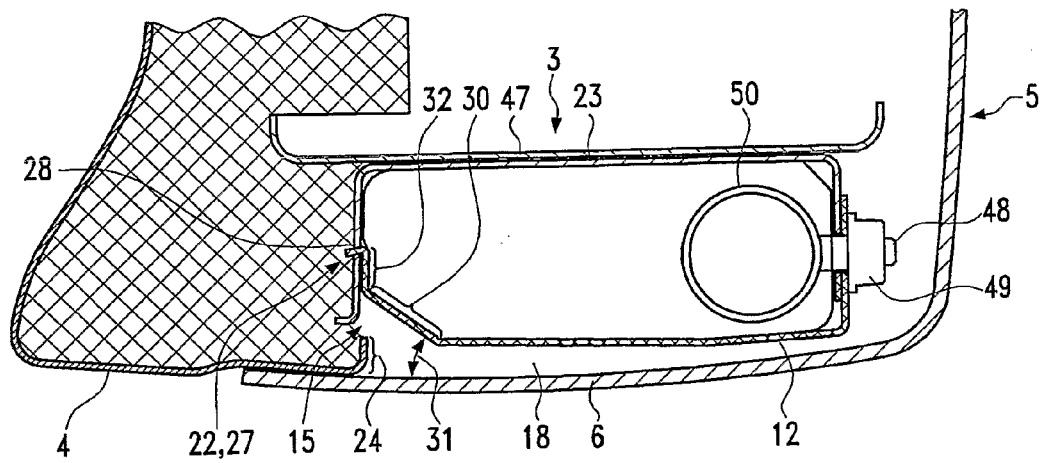
FIG. 5 shows a cross-section like FIG. 2 for a third embodiment.

In FIG. 5 a third embodiment of the invention is illustrated again using mounting plate 23 and package plate 12.

In this embodiment the front end section 15 of the package plate 12 comprises a first wall portion 30 and a second wall portion 32. Between the first wall portion 30 and inner surface of the lateral wall 6 an acuate angle 31 is formed, whereas the second wall portion 32 is arranged essentially perpendicular to lateral wall 6. At the end of this second wall portion 32 a hook-like element 27 as a plate fastening means 20 is formed, which is inserted in a hook-in opening 28 formed in mounting plate 23.

In FIG. 5 corresponding free end portion 24 of the cover 4 arranged within receiving space 7, see also FIG. 3, is so short that it ends in front of the hook-like element 27. However, as already said, in other levels along longitudinal direction 26 this free end portion 24 may be longer to allow the arrangement of corresponding cover fastening means 25.

Figure 6:
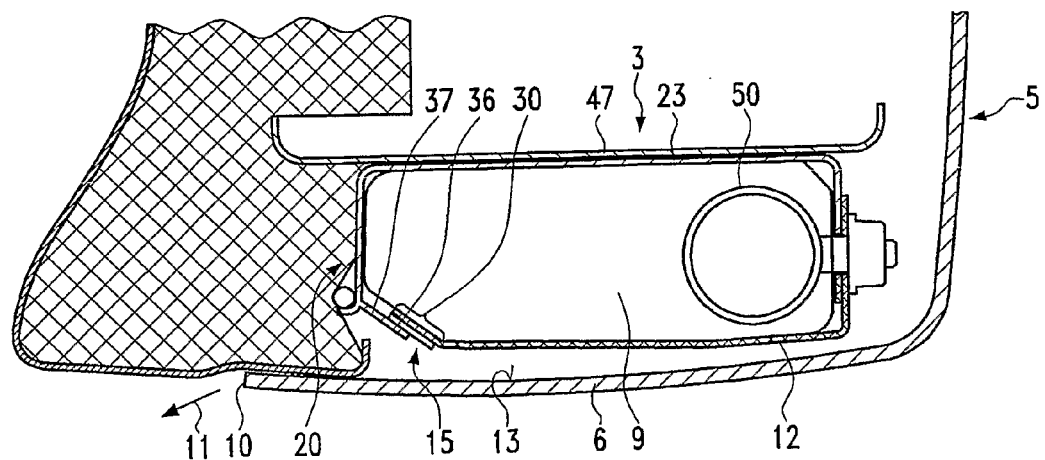
FIG. 6 shows a cross-section like FIG. 2 for a fourth embodiment.
Figure 7:
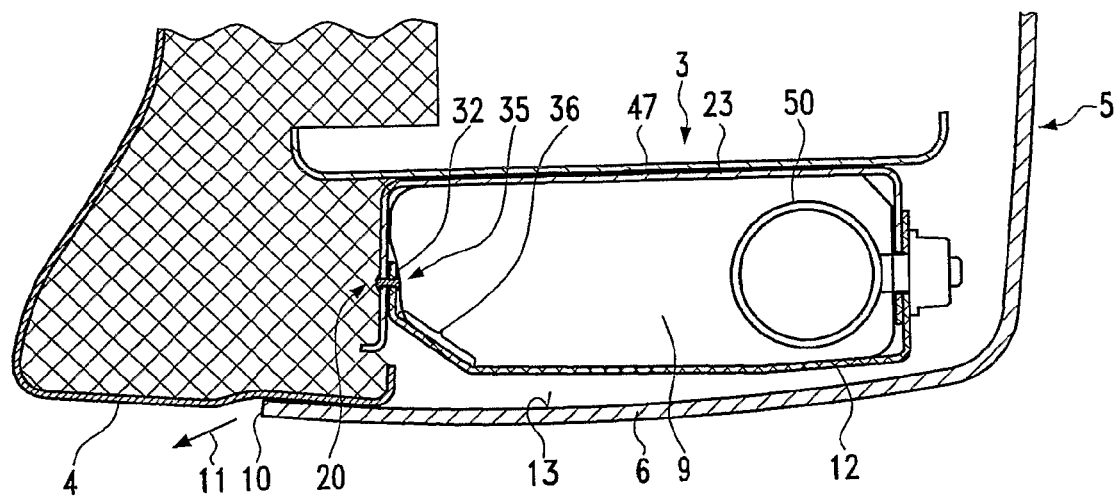
FIG. 7 shows a cross-section like FIG. 2 for a fifth embodiment.

In FIGS. 6 and 7 a fourth and fifth embodiment of the invention is illustrated. These embodiments are different from the embodiments already illustrated by the corresponding plate fastening means 20.

In FIG. 6 the plate fastening means 20 is formed by a toggle 37 which has a breaking point 36. In case the airbag is inflated by inflator means 50, this breaking point 36 will break, the package plate 12 will be bent outwardly until it contacts the inner surface 13 of lateral wall 6 and thereafter both lateral wall 6 and package plate 12 will be further opened to allow the deployment of the airbag along deployment direction 11. The toggle 37 is held by an end curvature of the mounting plate 23. The corresponding breaking point 36 is arranged between toggle 37 and the first wall portion 30 at front end section 15 of package plate 12.

In the fifth embodiment according to FIG. 7, the plate fastening means 20 is formed by a rivet 35 connecting second wall portion 32 of front end section 15 and mounting plate 23. Instead of a rivet 35 also a pin may be used, which is then introduced in a corresponding opening of the mounting plate 23.

All the other features of the embodiments of FIGS. 6 and 7 are very similar to the other embodiments according to FIGS. 2 to 5, such that repetition of these features is avoided.

Figure 8:
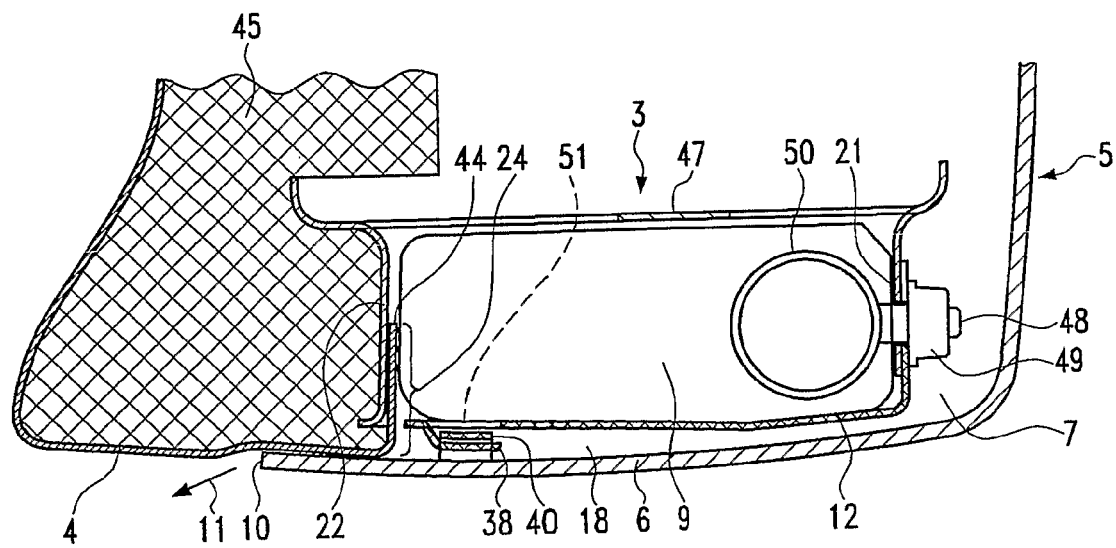
FIG. 8 shows a cross-section like FIG. 2 for a sixth embodiment.
Figure 9:
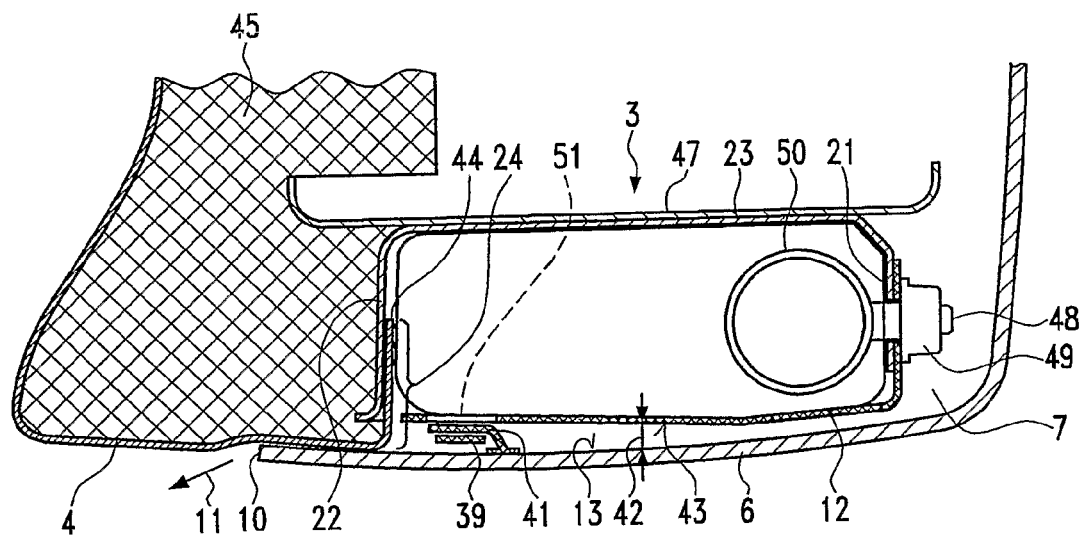
FIG. 9 shows a cross-section like FIG. 2 for a seventh embodiment.

The sixth and seventh embodiments according to FIGS. 8 and 9 are different from the other embodiments in that the package plate 12 is not fastened to the seat structure 3 or the mounting plate 23 at its front end section 15 but it is fastened to lateral wall 6.

In the sixth embodiment according to FIG. 8, SAM 9 is mounted to the corresponding brackets 21 or 22 of seat structure 3, see also FIG. 2. Cover 4 extends into the interior of the receiving space 7 with longer free end portion 24 wherein corresponding cover fastening means is not illustrated, see again FIG. 2.

Near a free end of package plate 12 in its front end section 15 a hook-like element 38 is formed which is in engagement with a bracket-like element 40 extending from the inner surface 13 of lateral wall 6. The hook-like element 38 is formed as a stamped-out part, see the stamp-out opening 51 in package plate 12.

In the seventh embodiment according to FIG. 9, a corresponding bracket-like element 39 is formed at the package plate 12 and extends from its outer surface 43 in direction to inner surface 13 of lateral wall 6, wherein a corresponding hook-like element 41 is protruding from the inner surface 13 in direction to the outer surface 43 of package plate 12.

In particular in the embodiments according to FIGS. 8 and 9 there will be no interference between the plate fastening means 20 and the cover fastening means 25 as they are arranged at different positions within receiving space 7.

Also in the embodiments according to FIGS. 8 and 9 it is possible to first push package plate 12 to the outside and later the package plate 12 together with lateral wall 6 will be further opened for deployment of the airbag, wherein in all of the embodiments a seat cushion material 45, like foam or the like, will be prevented from being expelled to the outside of the backrest as the receiving space 7 and in particular SAM 9 are more or less encompassed by package plate 12, mounting plate 23 and seat structure 3 with corresponding brackets 21 and 22. Consequently, any inflating airbag will be guided by those parts and, in particular, between cover 4 and front end section 15 or lateral wall 6 near its free end 10 to deploy in deployment direction 11.

Figure 10:
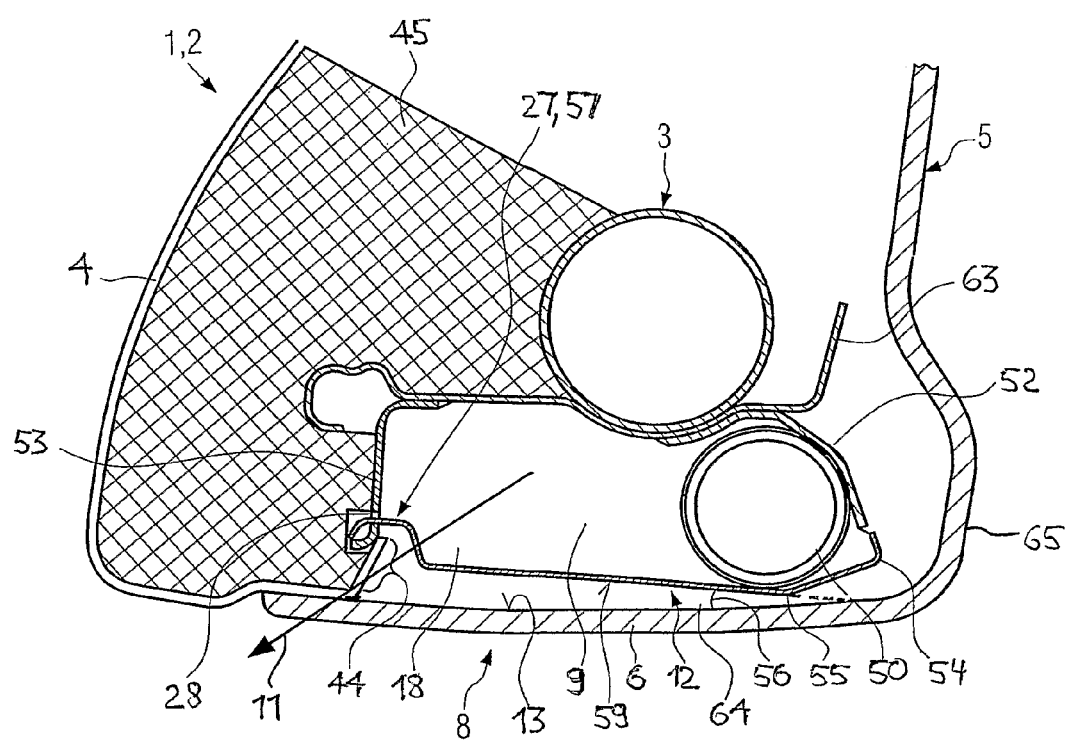
FIG. 10 shows a cross-section like FIG. 2 for an eighth embodiment.
Figure 11:
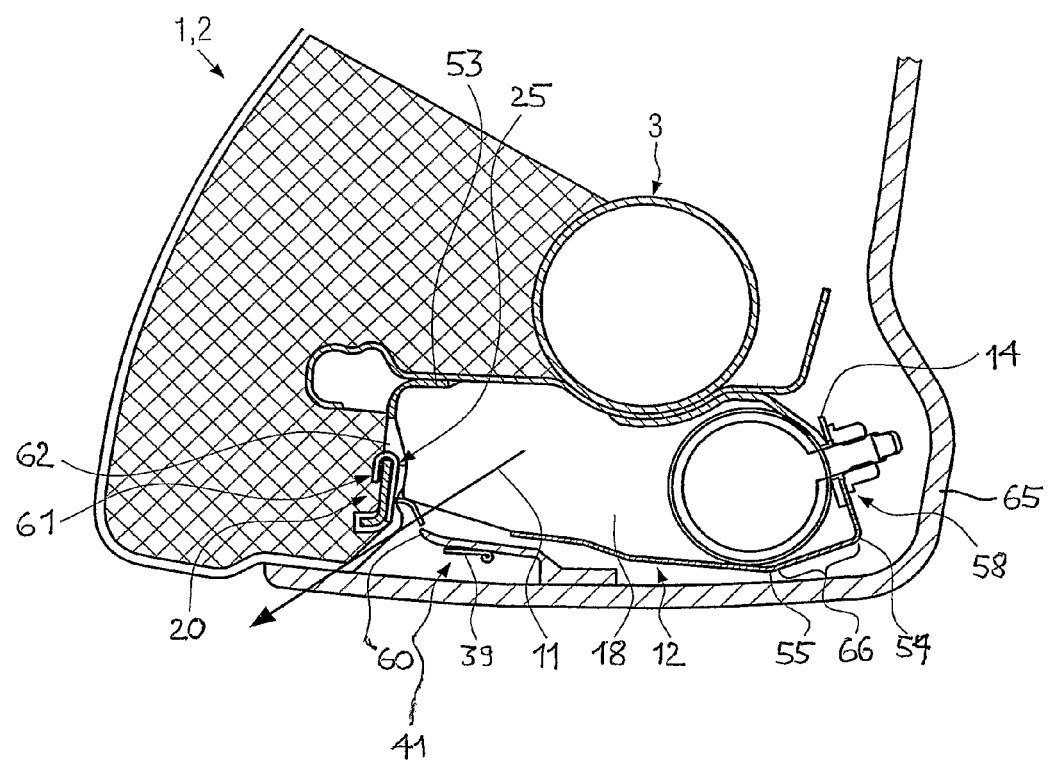
FIG. 11 shows a cross-section like FIG. 2 for a ninth embodiment.

FIGS. 10 and 11 show an eighth and a ninth embodiment of the invention with a slightly different seat structure 3. In both of these embodiments, a first and a second holding part 52, 53 is used, which in particular are releasably fixed to the corresponding seat structure 3.

The corresponding package plate 12 is releasably fixed with its back end section 14 or front end section 15 to the corresponding holding part 52, 53.

In FIG. 10, the package plate, see also FIG. 11, extends from the corresponding first holding part 52, see back end section 14, to a bending point 54 and thereafter with a section 66 essentially perpendicular to the corresponding bend end section 14. Along this section 66, the package plate approaches the inner surface 13 of the lateral wall 6 up to further bending point 55. From this bending point 55, the package plate extends under an angle 56 away from the inner surface 13, wherein the angle is approximately 5° to 30°. This means that the distance between outer surface 59 of the package plate and inner surface 13 of the lateral wall 6 increases in direction to front end section 15 of the package plate 12 where same is releasably fixed to second holding part 53.

A corresponding hook-like element 27 of the package plate 12 for fixing to the second holding part 53 is inserted in a corresponding hook-in opening 28 of this part.

The seat structure 3 also comprises a holding part section 63 extending away from first holding part 52 and generally extending essentially parallel to back panel 5.

Back panel 5 comprises a bulging 65 in connection to the sidewall 8 and arranged in the rear of inflator means 50. This bulging 65 protrudes to the rear from backrest 2.

According to this particular package plate 12 in FIG. 10 and also in FIG. 11, a corresponding space between outer surface 59 of the package plate and inner surface 13 of the later wall increases in direction to the front of the backrest, see also FIG. 3 or FIGS. 5 to 9.

In FIG. 11, package plate 12 is quite similar to FIG. 10 besides a step in the package plate in the area of hook-like element 41 of the lateral wall 6, which is in engagement with a bracket-like element 39 of the package plate 12.

The corresponding hook-like element 38 is formed like a clips 60, see the similar construction in FIG. 9.

The second holding part 53 is also used for fixing a cover 3 and 44 of cover 4. This cover 3 and 44 comprises cover fastening means 25 in the form of a profiled latch with, for example, three hook-up noses 61 in engagement with corresponding hook-in openings 62 formed in the second holding part 53.

In FIG. 11, it is again emphasized that the corresponding section 66 of the package plate 12 between the two bending points 54 and 55 extends essentially perpendicular to the back end section 14. This back end section 14 is formed as a fixing tongue 58, which is used for fixing to the first holding part 52, wherein together with the fixing tongue, also the inflator means 50 is fixed to this holding part.

The invention claimed is:
1. A seat comprising:
a backrest having a seat structure, a cover, and a back panel having a lateral wall covering a receiving space disposed in a side wall of the backrest in which a soft cover side airbag module (SAM) is arranged, wherein an airbag of the SAM will deploy between the cover and a free end of the lateral wall in a deployment direction; and a package plate arranged between the SAM and an inner surface of the lateral wall, the package plate being fastened at its back end section to the SAM and releasably fastened at its front end section within the receiving space, wherein the airbag will deploy between the front end section and the cover;

wherein a mounting plate is arranged at least partially between the SAM and the seat structure, wherein the SAM is mounted to the mounting plate and the mounting plate is fixed to the seat structure.

2. The seat according to claim 1, wherein the back end section has a first plate portion and the front end section has a second plate portion, wherein the first and second plate portions are arranged essentially perpendicular to each other.

3. The seat according to claim 1, wherein a first holding part and a second holding part are fixed to the seat structure and the front and back end sections are fixed to the second and first holding parts, respectively.

4. The seat according to claim 3, wherein the package plate extends from its first end to a bending point and thereafter approaches the inner surface of the lateral wall up to a further bending point from which the package plate extends away from the inner surface toward the second holding part at an angle of approximately 5 to 30°.

5. The seat according to claim 2, wherein the second plate portion extends along the inner surface of the lateral wall.

6. The seat according to claim 2, wherein a free space is formed between the second plate portion and the inner surface of the lateral wall.

7. The seat according to claim 1, wherein the front end section extends away from the lateral wall.

8. The seat according to claim 1, wherein the front end section includes a bending point arranged where a distance between the SAM and the inner surface is smallest.

9. The seat according to claim 1, wherein a free end of the front end section comprises a plate fastening means for releasably fastening the package plate to the seat structure and/or the SAM.

10. The seat according to claim 9, wherein the seat structure comprises a first bracket adapted for mounting the SAM and/or a second bracket adapted to releasably fasten the free end or front end section of the package plate.

11. The seat according to claim 1, wherein first and second holding parts are formed as plates that are releasably fixed to the seat structure.

12. The seat according to claim 3, wherein a first end of the package plate comprises a fixing tongue for fixing at the first holding part.

13. The seat according to claim 12, wherein the fixing tongue and a plate section of the package plate are arranged essentially vertical.

14. The seat according to claim 1, wherein the front end section extends toward a seat cushion.

15. The seat according to claim 10, wherein the first and second brackets are stamped-out parts of the seat structure.

16. The seat according to claim 1, wherein the cover has a free end portion arranged within the receiving space and comprises a cover fastening means adapted to fasten the cover at the seat structure and/or the mounting plate.

17. The seat according to claim 16, wherein the cover fastening means and a plate fastening means are independently cooperating with the seat structure and/or the mounting plate.

18. The seat according to claim 16, wherein the cover fastening means is formed by a profile latch with at least three hook-up noses, which are engaged with hook-end openings of a second holding part.

19. The seat according to claim 16, wherein the cover and/or plate fastening means are arranged in different levels along a longitudinal direction of the backrest.

20. The seat according to claim 16, wherein the cover and/or plate fastening means are alternately arranged along a longitudinal direction of the backrest.

21. A seat comprising:
a backrest having a seat structure, a cover and a back panel having a lateral wall covering a receiving space disposed in a side wall of the backrest in which a soft cover side airbag module (SAM) is arranged, wherein an airbag of the SAM will deploy between the cover and a free end of the lateral wall in a deployment direction; and a package plate arranged between the SAM and an inner surface of the lateral wall, the package plate being fastened at its back end section to the SAM and releasably fastened at its front end section within the receiving space, wherein the airbag will deploy between the front end section and the cover;

wherein a free end of the front end section includes a plate fastening means configured as a hook-like element inserted in a hook-in opening formed in a mounting plate arranged at least partially between the SAM and the seat structure and/or the seat structure.

22. The seat according to claim 21, wherein the hook-like element is formed by a hook extension at the front end section extending essentially parallel to a second plate portion.

23. The seat according to claim 21, wherein the hook-like element is formed by a hook extension at the front end section that bends toward the lateral wall.

24. The seat according to claim 21, wherein the front end section comprises at least a first wall portion extending at an acute angle relative to the inner surface of the lateral wall.

25. The seat according to claim 1, wherein the front end section comprises a second wall portion extending essentially perpendicular relative to the inner surface of the lateral wall.

26. The seat according to claim 21, wherein the hook-like element comprises at least one opening in which a protrusion extending from the seat structure and/or from the mounting plate is inserted.

27. The seat according to claim 26, wherein the protrusion is a stamped-out part of the seat structure or the mounting plate.

28. The seat according to claim 26, wherein the plate fastening means is formed by a pin-like element arranged between the front end section and the seat structure and/or the mounting plate.

29. The seat according to claim 26, wherein the plate fastening means is formed by a rivet arranged between the front end section and the seat structure and/or the mounting plate.

30. The seat according to claim 9, wherein the plate fastening means comprises a predetermined breaking point which will break by inflating the airbag.

31. The seat according to claim 9, wherein the plate fastening means is formed by a toggle arranged between the seat structure or the mounting plate and the package plate, wherein the toggle has a predetermined breaking point.

32. The seat according to claim 21, wherein the plate fastening means is formed by a hook-like element and/or a bracket-like element protruding toward the inner surface of the lateral wall and cooperating with the bracket-like element and/or the hook-like element protruding from the inner surface of the lateral wall.

33. The seat according to claim 32, wherein the hook-like element is formed as a clip.

34. The seat according to claim 32, wherein the hook-like and/or bracket-like elements of the package plate are stamped-out parts.

35. The seat according to claim 1, wherein a distance between the inner surface of the lateral wall and an outer surface of the package plate increases in a direction extending toward the free end of the lateral wall.

36. The seat according to claim 1, wherein the back panel has a constant wall thickness.

37. The seat according to claim 1, wherein the lateral wall extends further than the SAM and thereafter at least partially along the cover.

38. The seat according to claim 1, wherein the back panel includes a bulge that protrudes from the backrest in a rear direction.

* * * * *